(12) United States Patent
Tamai et al.

(10) Patent No.: US 6,383,648 B1
(45) Date of Patent: May 7, 2002

(54) CURABLE COMPOSITION FOR TOPCOATING AND ARTICLES COATED THEREWITH

(75) Inventors: Hitoshi Tamai, Takasago; Masaharu Inoue, Kobe, both of (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/402,821

(22) PCT Filed: Apr. 10, 1998

(86) PCT No.: PCT/JP98/01663

§ 371 Date: Dec. 30, 1999

§ 102(e) Date: Dec. 30, 1999

(87) PCT Pub. No.: WO98/46691

PCT Pub. Date: Oct. 22, 1998

(30) Foreign Application Priority Data

Apr. 11, 1997 (JP) .............................................. 9-093265

(51) Int. Cl.$^7$ ............................ B32B 9/04; C08G 77/04
(52) U.S. Cl. ..................... 428/447; 428/446; 428/450; 525/100; 525/105; 525/106; 528/33; 528/34
(58) Field of Search ................................ 428/413, 414, 428/416, 418, 446, 447, 450; 525/100, 105, 106; 528/33, 34

(56) References Cited

U.S. PATENT DOCUMENTS

| | | | | |
|---|---|---|---|---|
| 4,371,664 A | * | 2/1983 | Kato et al. .................. | 525/100 |
| 5,223,495 A | * | 6/1993 | Inoue et al. ................. | 524/188 |
| 5,376,720 A | * | 12/1994 | Ando ........................... | 525/63 |
| 5,668,194 A | * | 9/1997 | Ando et al. ................. | 523/201 |

FOREIGN PATENT DOCUMENTS

| | | |
|---|---|---|
| JP | 57-172917 | 10/1982 |
| JP | 62-292820 | 12/1987 |
| JP | 2-64120 | 3/1990 |
| JP | 3-229673 | 10/1991 |
| JP | 4-292674 | 10/1992 |
| JP | 4-318014 | 11/1992 |
| JP | 7-136584 | 5/1995 |
| JP | 7-331136 | 12/1995 |
| JP | 8-259887 | 10/1996 |
| JP | 9-249732 | 9/1997 |
| WO | WO 94/06870 | 3/1994 |

OTHER PUBLICATIONS

Patent Abstracts of Japan, vol. 1999, No. 9, Jul. 30, 1999 & JP 11 116894 A, Apr. 27, 1999.
Patent Abstracts of Japan, vol. 012, No. 132, Apr. 22, 1988 & JP 62 253670 A, Nov. 5, 1987.
Patent Abstracts of Japan, vol. 1996, No. 7, Jul. 31, 1996 & JP 08 060094 A, Mar. 5, 1996.

* cited by examiner

Primary Examiner—Paul Thibodeau
Assistant Examiner—Monique R. Jackson
(74) Attorney, Agent, or Firm—Connolly Bove Lodge & Hutz

(57) ABSTRACT

The present invention has its objects to provide a curable composition for top coating which has an excellent stain resistance, adhesiveness, solvent resistance and impact resistance. The present invention relates to a curable composition for top coating which comprises an acrylic copolymer (A) containing a reactive silyl group bound to a carbon atom as represented by the general formula (1)

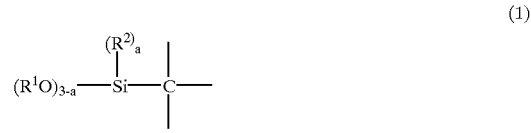

(1)

(wherein $R^1$ represents a hydrogen atom or an alkyl group containing 1 to 10 carbon atoms, $R^2$ represents a hydrogen atom or a univalent hydrocarbon group selected from among alkyl groups containing 1 to 10 carbon atoms, aryl groups and aralkyl groups and a represents an integer of 0 to 2), together with a hydroxyl group; 2 to 70 parts by weight, per 100 parts by weight of acrylic copolymer (A), of a silicon compound represented by the general formula (2)

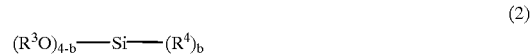

(2)

(wherein $R^3$ represents a univalent hydrocarbon group selected from among alkyl groups containing 1 to 10 carbon atoms, aryl groups and aralkyl groups, $R^4$ represents a univalent hydrocarbon group selected from among alkyl groups containing 1 to 10 carbon atoms, aryl groups and aralkyl groups and b represents 0 or 1), and/or a partial hydrolyzate condensate (B) thereof; and 0.1 to 50 parts by weight of a compound (C) containing two or more isocyanate groups which serves as a crosslinking agent.

19 Claims, No Drawings

CURABLE COMPOSITION FOR TOPCOATING AND ARTICLES COATED THEREWITH

TECHNICAL FIELD

The present invention relates to a curable composition for top coating. More particularly, the invention relates to a curable composition for top coating which can be successfully applied to structures, household electric appliances, industrial equipment and the like of metal, ceramics, glass, cement, molded ceramics, inorganic boards, plastics, wood, paper, fiber and/or other material and to an article coated with said curable composition for top coating.

BACKGROUND ART

So far, the appearance, corrosion resistance, weather resistance and other properties of buildings, industrial products such as architectural members and the like made of a ceramic composition, concrete, steel or the like have been improved by surface coating using a paint such as a fluororesin paint, an acryl-urethane resin paint or an acryl-silicone resin paint. In addition, with the increased awareness of recent aggravation of the environment and increased consciousness of the need for conservation of landscaping in urban communities, coating compositions provided with stain resistance have been developed and marketed.

Among such paints, an acryl-silicone paint, however, is still unsatisfactory in adhesion to substrates because of its mode of crosslinking as compared with the other two types of paints. Thus, shrinking may occur when a plurality of coats are applied or, because of poor solvent resistance, shrinking may occur when they are used in combination with epoxy type coatings. The impact resistance may also be insufficient when steel sheets are coated.

SUMMARY OF THE INVENTION

In view of the above state of the art, the present inventors made intensive investigations and, as a result, found that a composition which comprises an acrylic copolymer containing a specific reactive silyl group and a hydroxyl group as essential constituents, a specific silicon-containing compound, a polyfunctional isocyanate compound and a specific curing catalyst in specific proportions is curable at ordinary temperature or under heating and that the coat obtained from said composition shows the same excellent weather resistance as that exhibited by the coats formed from the acryl-silicone resin coating compositions and, yet, is improved in stain resistance, adhesiveness, solvent resistance and impact resistance.

In the case of the conventional one-component compositions prepared by incorporating a curing catalyst in advance, the viscosity thereof increases in a short time so that its pot life is limited.

Thus, in the prior art, when isocyanate compounds are used, it is difficult to prepare a one-component composition by using a curing catalyst. However, by selecting the curing catalyst of the present invention, it has become possible to provide a one-component composition.

The present invention thus provides a curable composition for top coating which comprises an acrylic copolymer (A) containing a reactive silyl group bound to a carbon atom as represented by the following general formula (1)

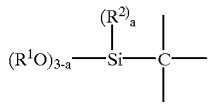

(1)

(wherein $R^1$ represents a hydrogen atom or an alkyl group containing 1 to 10 carbon atoms, $R^2$ represents a hydrogen atom or a univalent hydrocarbon group selected from among alkyl groups containing 1 to 10 carbon atoms, aryl groups and aralkyl groups and a represents an integer of 0 to 2), together with a hydroxyl group, 2 to 70 parts by weight, per 100 parts by weight of said acrylic copolymer (A), of a silicon compound represented by the general formula (2)

(2)

(wherein $R^3$ represents a univalent hydrocarbon group selected from among alkyl groups containing 1 to 10 carbon atoms, aryl groups and aralkyl groups, $R^4$ represents a univalent hydrocarbon group selected from among alkyl groups containing 1 to 10 carbon atoms, aryl groups and aralkyl groups and b represents 0 or 1), and/or a partial hydrolyzate condensate (B) thereof and 0.1 to 50 parts by weight of a compound (C) containing two or more isocyanate groups which serves as a crosslinking agent.

Said acrylic copolymer (A) is preferably a copolymer which contains 3 to 90% by weight of monomer units comprising the carbon-bound reactive silyl group as represented by general formula (1) within the molecule thereof. Such acrylic copolymer (A) is preferably a copolymer containing a n-butyl methacrylate unit as a polymer-constituting unit.

In another aspect, the present invention provides a curable composition for top coating which comprises 0 to 20 parts by weight of an organometallic compound (D) incorporated as a curing catalyst in the above-mentioned curable composition for top coating. Said organometallic compound (D) is preferably an organotin compound. Further, said organometallic compound (D) is preferably an organotin compound. Said organometallic compound (D) is preferably a compound containing a sulfur atom within the molecule thereof. It is also preferred that said organometallic compound (D) be an aluminum chelate compound.

It is preferred that the above-mentioned curable composition for top coating further comprises a mercapto-containing hydrocarbon and/or a mercaptosilane (E) incorporated.

In a further aspect, the present invention provides a coated article which is coated with the above-mentioned curable composition for top coating.

In a still further aspect, the present invention provides a coated article which is coated with a metallic powder- and/or color pigment-containing coating composition and further with a top coat clear coating composition thereon, wherein said clear top coat composition contains the above-mentioned curable composition for top coating as a main component thereof.

In a further aspect, the present invention provides a coated article which is coated with a coating composition comprising a dispersion of the above-mentioned curable composition for top coating and a pigment as main components thereof.

DETAILED DESCRIPTION OF THE INVENTION

The curable composition for top coating according to the present invention contains, as a base resin which is curable at room temperature in the presence of moisture, the acrylic copolymer (A) having a reactive silyl group bound to a carbon atom as represented by the general formula (1):

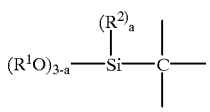
(1)

(wherein $R^1$ represents a hydrogen atom or an alkyl group containing 1 to 10 carbon atoms, $R^2$ represents a hydrogen atom or a univalent hydrocarbon group selected from among alkyl groups containing 1 to 10 carbon atoms, aryl groups and aralkyl groups and a represents an integer of 0 to 2), together with a hydroxyl group.

Since said acrylic copolymer (A) is a copolymer the main chain of which is substantially a main chain resulting from copolymerization of an acrylic monomer (main chain such main chain is hereinafter referred to also as "main chain substantially comprises an acrylic copolymer chain"), it becomes possible for the coatings formed from the curable composition for top coating according to the present invention to have excellent weather resistance and excellent chemical resistance, among others.

By saying that the main chain of said acrylic copolymer (A) substantially comprises an acrylic copolymer chain, it is meant that not less than 50%, preferably not less than 70%, of those units which constitute the main chain of said acrylic copolymer (A) are acrylic monomer units. Since the acrylic copolymer (A) contains a reactive silyl group in a form bound to a carbon atom, it also becomes possible to be excellent in water resistance, alkali resistance and acid resistance, among others.

In the acrylic copolymer (A), the number of carbon-bound reactive silyl groups of general formula (1) is preferably two or more, more preferably three or more, so that the coatings formed from the composition of the present invention may have good durability, typically good weather resistance and good solvent resistance.

The reactive silyl group represented by the above general formula (1) may be bound to the main chain of the acrylic copolymer (A) either at a terminal group or at a side chain thereof, or may be bound to such silyl groups at both a terminal group(s) and a side chain(s) of the main chain.

In the above general formula (1), $R^1$ is a hydrogen atom or an alkyl group containing 1 to 10 carbon atoms, preferably an alkyl group containing 1 to 4 carbon atoms such as methyl, ethyl, n-propyl, i-propyl, n-butyl or i-butyl. If said alkyl group contains more than 10 carbon atoms, the reactivity of the resulting reactive silyl group tends to decrease. In cases where $R^1$ is a group other than the alkyl group, for example phenyl and benzyl, the reactivity of the reactive silyl group also tends to decrease.

In the above general formula (1), $R^2$ is a hydrogen atom or a univalent hydrocarbon group selected from among alkyl groups containing 1 to 10 carbon atoms, preferably alkyl groups containing 1 to 4 carbon atoms such as those specifically mentioned hereinabove in relation to the group $R^1$, aryl groups preferably containing 6 to 25 carbon atoms, such as phenyl, and aralkyl groups preferably containing 7 to 12 carbon atoms, such as benzyl. Among these, alkyl groups containing 1 to 4 carbon atoms are preferred in view of the fact that the resulting compositions of the present invention are excellent in curability.

In the above general formula (1), $(R^1O)_{3-a}$ is selected so that 3–a may have a value of 1 to 3, namely that a may have a value of 0 to 2. For providing the acrylic copolymer (A) with better curability, however, it is preferred that the value a be 0 or 1. Accordingly, the number of $R^2$ groups bound is preferably 0 or 1.

In cases where the number of groups represented by $(R^1O)_{3-a}$ or $R^2_a$ in general formula (1) is 2 or more, the two or more $R^1$ or $R^2$ groups contained may be the same or different.

As specific examples of the carbon-bound reactive silyl group represented by the general formula (1), there may be mentioned those groups which are to be mentioned later herein as examples of the corresponding group contained in the reactive silyl-containing monomer.

Preferred as the acrylic copolymer (A) are what contain monomer units containing a carbon-bound reactive silyl group(s) represented by the general formula (1) within the molecule thereof because of ease of synthesis thereof. For the coatings formed by using the composition of the present invention to have excellent durability and strength characteristics, the proportion of said monomer units in the acrylic copolymer (A) is preferably 3 to 90%, more preferably 10 to 70%, most preferably 10 to 50%.

As those monomer units other than the carbon-bound reactive silyl-containing monomer units represnted by general formula (1) which are to be contained in the above acrylic copolymer (A), there may be mentioned units derived from the acrylic monomers to be mentioned later herein and units derived from other monomers to be mentioned later herein and to be used when necessary.

For the coatings formed by using the composition of the present invention to have good durability and other physical properties, a number average molecular weight of the acrylic copolymer (A) is preferably 1,000 to 30,000, in particular 3,000 to 25,000.

Such acrylic copolymers (A) as mentioned above may be used either singly or in combination of two or more of them.

An example of the method of preparing the acrylic copolymer (A) is described in the following.

The acrylic copolymer (A) can be produced, for example, by subjecting to polymerization of a monomer (hereinafter, monomer (A-1)) containing a polymerizable double bond and a carbon-bound reactive silyl group, a hydroxyl-containing monomer and/or a derivative thereof (hereinafter, monomer (A-2)), (meth)acrylic acid and/or a derivative thereof (hereinafter, monomer (A-3)), and other monomers used as necessary.

As specific examples of said monomer (A-1), there may be mentioned compounds represented by the general formula (3):

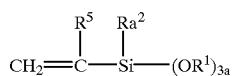
(3)

(wherein $R^1$, $R^2$ and a are as defined above and $R^5$ represents a hydrogen atom or a methyl group), such as,

(3-1)

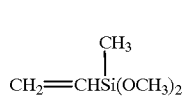
(3-2)

(3-3)

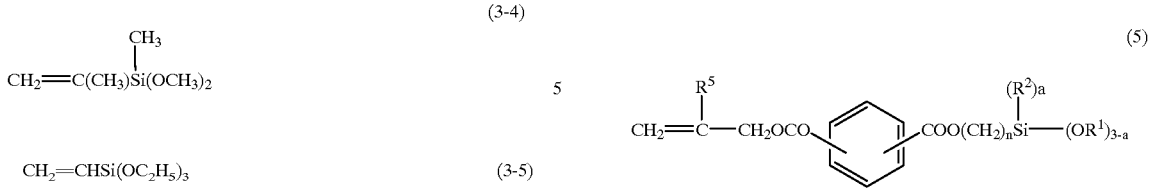

(3-4)

CH₂=C(CH₃)Si(OCH₃)₂ with CH₃ substituent (3-5) CH₂=CHSi(OC₂H₅)₃

(3-6) CH₂=CHSi(OC₂H₅)₂ with CH₃ substituent (3-7) CH₂=CHSi(OC₃H₇)₃

(3-8) CH₂=CHSi(OC₄H₉)₃

(3-9) CH₂=CHSi(OC₆H₁₃)₃

(3-10) CH₂=CHSi(OC₈H₁₇)₃

(3-11) CH₂=CHSi(OC₁₀H₂₁)₃ compounds represented by the general formula (4):

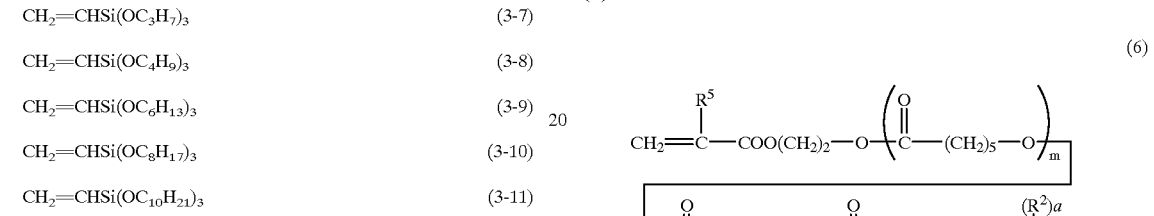

(4)

(wherein $R^1$, $R^2$, $R^5$ and a are as defined above and n represents an integer of 1 to 12), such as, (4-1) CH₂=CHCOO(CH₂)₃Si(OCH₃)₃

(4-2) CH₂=CHCOO(CH₂)₃Si(OCH₃)₂ with CH₃

(4-3) CH₂=C(CH₃)COO(CH₂)₃Si(OCH₃)₃

(4-4) CH₂=C(CH₃)COO(CH₂)₃Si(OCH₃)₂ with CH₃

(4-5) CH₂=CHCOO(CH₂)₃Si(OC₂H₅)₃

(4-6) CH₂=CHCOO(CH₂)₃Si(OC₂H₅)₂ with CH₃

(4-7) CH₂=C(CH₃)COO(CH₂)₃Si(OC₂H₅)₃

(4-8) CH₂=C(CH₃)COO(CH₂)₃Si(OC₂H₅)₂ with CH₃

(4-9) CH₂=C(CH₃)COO(CH₂)₁₁Si(OCH₃)₃ compounds represented by the general formula (5):

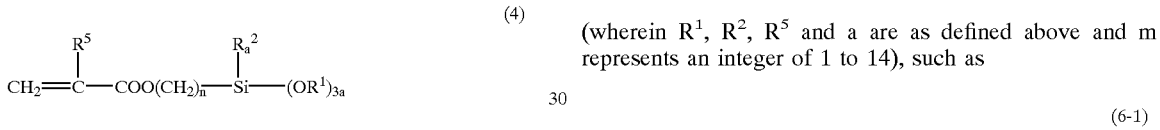

(5)

(wherein $R^1$, $R^2$, $R^5$, a and n are as defined above), such as CH₂=CH—CH₂OCO(o—C₆H₄)COO(CH₂)₃Si(OCH₃)₃ and CH₂=CH—CH₂OCO(o—C₆H₄)COO(CH₂)₃Si(CH₂)(OCH₃)₂; compounds represented by the general formula (6):

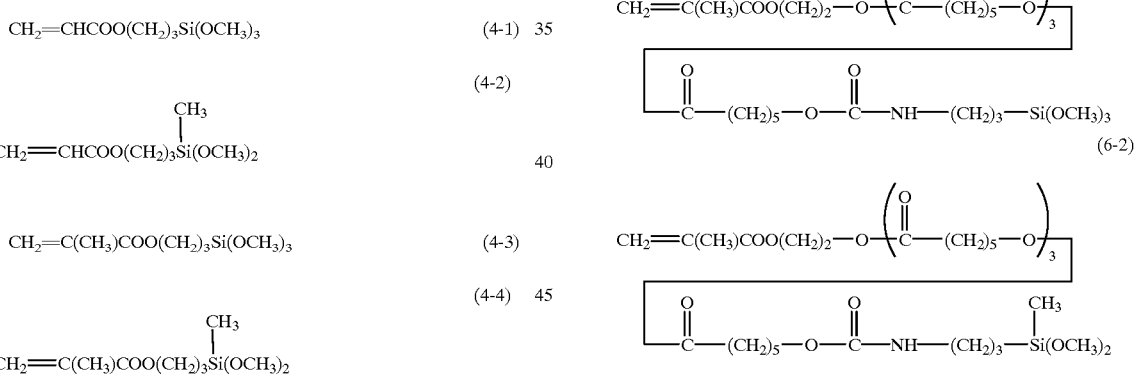

(6)

(wherein $R^1$, $R^2$, $R^5$ and a are as defined above and m represents an integer of 1 to 14), such as (6-1)

(6-2)

compounds represented by the general formula (7):

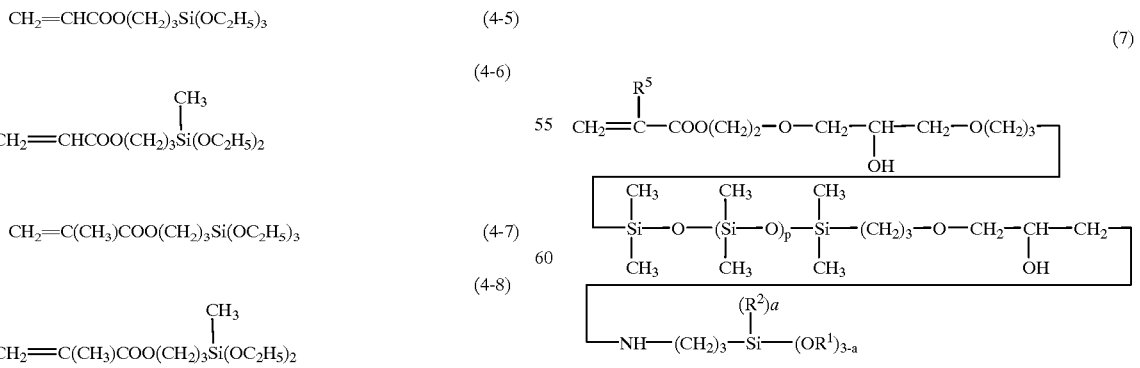

(7)

(wherein $R^1$, $R^2$, $R^5$ and a are as defined above and q represents an integer of 0 to 22), such as (7-1)

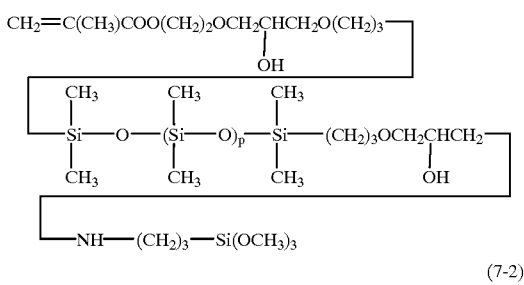

(7-2)

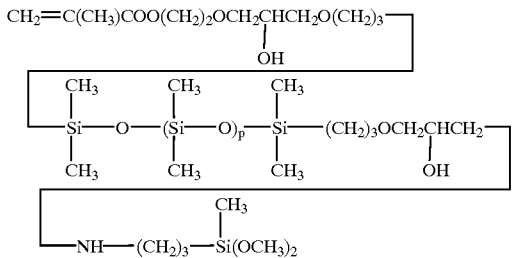

(in which p represents an integer of 0 to 20); (meth)acrylates terminally having a carbon-bound reactive silyl group via a urethane or siloxane bond; and the like. Among these, those compounds which are represented by the above general formula (4) are preferred from the viewpoint of copolymerizability and polymerization stability and of excellent curability and storage stability of the resulting curable compositions.

Such monomers (A-1) may be used either singly or two or more of them may be used in combination. Said monomers (A-1) are used preferably in a manner such that the monomer (s) containing a carbon-bound reactive silyl group represented by general formula (1) should be contained in the product acrylic copolymer (A) in a proportion of 3 to 90%, more preferably 8 to 70%, most preferably 11 to 50%, as mentioned hereinabove.

As specific examples of above-mentioned monomer (A-2), there may be mentioned hydroxyalkyl (meth)acrylates, such as 2-hydroxyethyl (meth)acrylate, 2-hydroxypropyl (meth)acrylate, 2-hydroxybutyl (meth) acrylate and 4-hydroxybutyl (meth)acrylate; 2-hydroxyethyl vinyl ether, N-methylol(meth)acrylamide; 4-hydroxystyrene, vinyltoluene; Aronix 5700 (product of Toa-Gosei Co.); 4-hydroxystyrene: HE-10, HE-20, HP-1 and HP-20 (hydoxyl-terminated acrylic ester oligomers (products of Nippon Shokubai Co.); Blemmer PP series monomers (polypropylene glycol methacrylate), Blemmer PE series monomers (polyethylene glycol monomethacrylate), Blemmer PEP series monomers (polyethylene glycol polypropylene glycol methacrylate), Blemmer AP-400 (polypropylene glycol monoacrylate), Blemmer AE-350 (polyethylene glycol monoacrylate) and Blemmer GLM (glycerol monomethacrylate);hydroxyalkyl acrylate such as N-methylol(meth)acrylamide; ε-caprolactone-modified hydroxyalkyl vinyl copolymer compounds obtained by the reaction of a hydroxyl-containing compound and ε-caprolactone such as Placcel FA-1, Placcel FA-4, Placcel FM-1 and Placcel FM-4 (products of Daicel Chemical Industries); Tone M-201 (product of UCC); polycarbonate-containing vinyl compounds, typically HEAC-1 (product of Daicel Chemical Industries); and the like. Among them, 2-hydroxyethyl (meth)acrylate, 2-hydroxypropyl (meth)acrylate, 2-hydroxybutyl (meth)acrylate and 4-hydroxybutyl (meth) acrylate are preferred, since they are excellent in reactivity with isocyanates and give coatings having good weather resistance, chemical resistance and impact resistance. Particularly preferred are 2-hydroxyethyl (meth)acrylate and 2-hydroxypropyl (meth)acrylate. They are used preferably in an amount, expressed in terms of hydroxyl equivalent (molecular weight of resin per OH group), of not less 300, more preferably not less than 400, most preferably not less than 500.

These copolymerizable vinyl monomers containing an alcoholic hydroxyl group may be used either singly or two or more of them may be used in combination.

As specific examples of the monomer (A-3) mentioned above, there may be mentioned, among others, methyl (meth)acrylate, ethyl (meth)acrylate, n-butyl (meth)acrylate, isobutyl (meth)acrylate, tert-butyl (meth)acrylate, 3,3,5-trimethylcyclohexyl (meth)acrylate, 2-ethylhexyl (meth) acrylate, stearyl (meth)acrylate, lauryl (meth)acrylate, benzyl (meth)acrylate, cyclohexyl (meth)acrylate, trifluoroethyl (meth)acrylate, pentafluoropropyl (meth)acrylate, perfluorocyclohexyl (meth)acrylate, (meth)acrylonitrile, glycidyl (meth)acrylate, isobornyl (meth)acrylate, dimethylaminoethyl (meth)acrylate, diethylaminoethyl (meth)acrylate, (meth)acrylamide, α-ethyl(meth)acrylamide, N-butoxymethyl (meth)acrylamide, N,N-dimethyl(meth) acrylamide, N-methyl(meth)acrylamide, (meth) acryloylmorpholine, Aronix M-5700, macromonomers AS-6, AN-6, AA-6, AB-6 and AK-6 (products of Toa-Gosei Co.), and like compounds, phosphate group-containing (meth)acrylic compound such as condensation products of hydroxyalkyl acrylates with phosphoric acid or phosphoric acid esters, and urethane or siloxane bond-containing (meth) acrylates. It is preferred that, among these, n-butyl (meth) acrylate be preferably comprised, since the resulting acrylic copolymer (A) has good compatibility with the silicon compound represented by general formula (2) and/or the partial hydrolyzate condensate (B) thereof, which is to be mentioned later herein.

These monomers (A-2) may be used either singly or two or more of them may be used in combination. Where the acrylic copolymer (A) comprises 3 to 90% of monomer units derived from a monomer(s) containing a carbon-bound reactive silyl group represented by the general formula (1) within the molecule and further comprises n-butyl methacrylate units, all the effects obtainable when said copolymer comprise these can be obtained.

The total proportion of said monomers (A-2) and (A-3) may be appropriately adjusted according to the species and amount of the monomer (A-1) employed. Generally, however, said total proportion is preferably 5 to 90%, more preferably 30 to 85%, most preferably 50 to 85%, based on the amount of the polymerizable components. The proportion of the monomer (A-1) is preferably 1 to 50%, more preferably 3 to 40%, most preferably 5 to 30%, based on the amount of the polymerizable components. When n-butyl methacrylate is used as monomer (A-3), the proportion thereof is preferably 20 to 50% of the monomer mixture, since good compatibility with the silicon compound of general formula (2) and/or a partial hydrolyzate condensate (B), which is to be mentioned later herein, is then obtained, and various characteristics of the coatings formed from the resulting curable composition are well balanced.

In the practice of the present invention, a segment formed by urethane or siloxane bonding to the main chain, a segment derived from a monomer other than monomer (A-1), monomer (A-2) or monomer (A-3) or some other segment may be introduced, in an amount not exceeding 50%, in the step of producing the acrylic copolymer (A) for the purpose of further improving the weather resistance of the coatings formed from the composition of the present invention.

As specific examples of said monomer other than monomer (A-1), monomer (A-2) or monomer (A-3), there may be mentioned, aromatic hydrocarbon-based vinyl compounds, such as styrene, α-methylstyrene, chlorostyrene, styrene-sulfonic acid, 4-hydroxystyrene and vinyltoluene; unsaturated carboxylic acids such as maleic acid, fumaric acid, itaconic acid and (meth)acrylic acid, as well as salts thereof such as alkali metal salts, ammonium salts and amine salts; unsaturated carboxylic acid anhydrides such as maleic anhydride, as well as unsaturated carboxylic acid esters such as diesters or half esters derived from such acid anhydrides and straight or branched alcohols or amines containing 1 to 20 carbon atoms; vinyl esters and allyl compounds such as vinyl acetate, vinyl propionate and diallyl phthalate; amino-containing vinyl compounds such as vinylpyridine and aminoethyl vinyl ether; amido-containing vinyl compounds such as itaconic diamide, crotonic amide, maleic diamide, fumaric diamide and N-vinylpyrrolidone; and other vinyl compounds such as 2-hydroxyethyl vinyl ether, methyl vinyl ether, cyclohexyl vinyl ether, vinyl chloride, vinylidene chloride, chloroprene, propylene, butadiene, isoprene, maleimide fluoroolefins, N-vinylimidazole and vinylsulfonic acid and the like.

These may be used either singly or two or more of them may be used in combination. The acrylic copolymer (A) may contain groups such as carboxyl or amino groups and, in that case, the curability and adhesiveness may be improved but those carboxyl or amino groups which are bound to the polymer chain are weak in reactivity and the use thereof as curing catalysts for curing will not give cured products having good characteristics.

Further, in the coating composition of the present invention, it is possible to add nonaqueous polymer particles (NAD) obtained by nonaqueous dispersion polymerization using an alkoxysilyl-containing copolymer as a dispersion stabilizer resin. This component, with addition of very small amounts, makes it possible to attain reduction in viscosity and high solid contents of the coating composition and, furthermore, improve the impact resistance of cured coatings. Those monomers which are used for the acrylic copolymer (A) can be used as monomers which are used in the production of nonaqueous polymer particles (NAD) constituting the above-mentioned additive component.

The acrylic copolymer (A) mentioned above can be produced, for example, by the hydrosilylation method or solution polymerization method using a reactive silyl-containing monomer as described in Japanese Kokai Publications Sho-54-36395, Sho-57-55954 and elsewhere. From the viewpoint of ease of synthesis, in particular, it is particularly preferred, however, to produce the same by solution polymerization using a reactive silyl-containing monomer and using an azo compound radical polymerization initiator such as azobisisobutyro nitrile.

The solvent to be used in said solution polymerization may be any nonaqueous one without any particular restriction, thus including, among others, hydrocarbons such as toluene, xylene, n-hexane and cyclohexane; acetate esters such as ethyl acetate and butyl acetate; cellosolves such as ethylcellosolve and butylcellosolve; ether esters such as cellosolve acetate; ketones such as methyl ethyl ketone, ethyl acetoacetate, acetylacetone, methyl isobutyl ketone and acetone; and alcohols such as methanol, isopropyl alcohol, n-butanol, isobutanol, hexanol and octanol.

In the solution polymerization mentioned above, the molecular weight of the acrylic copolymer (A) may be adjusted as necessary by using, wherein the acrylic copolymer (A) can be obtained singly or combinedly chain transfer agents such as n-dodecylmercaptan,t-dodecylmercaptan, n-butylmercaptan, γ-mercaptopropyltrimethoxysilane, γ-mercaptopropyltriethoxysilane, $(CH_3O)_3Si$—S—S—Si $(OCH_3)_3$ and $(CH_3O)_3Si$—$S_8$—$Si(OCH_3)_3$. In particular when a chain transfer agent having an alkoxysilyl group within the molecule such as γ-mercaptopropyltrimethoxysilane is used, the reactive silyl group can preferably be introduced terminally into the acrylic copolymer (A). Such a chain transfer agent is preferably used in an amount of 0.05 to 10%, in particular 0.1 to 8%, based on the sum total of the polymerization components used.

In the practice of the present invention, 2 to 70 parts by weight of a compound (B) derived from a silicon compound represented by the general formula (2):

$$(R^3O)_{4-b}\text{—Si—}R^4{}_b \tag{2}$$

(wherein $R^3$ represents a univalent hydrocarbon group selected from among alkyl groups containing 1 to 10 carbon atoms, an aryl group and aralkyl group, $R^4$ represents a univalent hydrocarbon group selected from among alkyl groups containing 1 to 10 carbon atoms, aryl groups and aralkyl groups, and b represents 0 or 1), by hydrolysis in an alcohol solvent under acidic conditions (hereinafter said compound is referred to as partial hydrolyzate condensate (B) of silicon compound), which is a component for improving the stain resistance of the coatings formed from the composition of the present invention and at the same time improving the adhesion between said coatings and the coating substrates, is used in combination with the above-mentioned acrylic copolymer (A). Admixing of the partial hydrolyzate condensate (B) of silicon compound with the acrylic copolymer (A) gives a composition having curability at room temperature and curability under heating, and coatings formed by using said composition have excellent stain resistance. The reason why said coatings have good stain resistance is not so clear. Perhaps it results from improvements in surface hardness and hydrophilicity owing to the difference in relative curing rate and the compatibility between the acrylic copolymer (A) and silicon compound (B).

In the above general formula (2), $R^3$ is a univalent hydrocarbon group selected from among alkyl groups containing 1 to 10 carbon atoms, preferably alkyl groups containing 1 to 4 carbon atoms such as methyl, ethyl, n-propyl, i-propyl, n-butyl and i-butyl, aryl groups, preferably aryl groups containing 6 to 9 carbon atoms such as phenyl and aralkyl groups, preferably aralkyl groups containing 7 to 9 carbon atoms such as benzyl.

When the number of carbon atoms in the alkyl group exceeds 10, the reactivity of the partial hydrolyzate condensate (B) of silicon compound tends to decrease. When $R^3$ is other than the above-mentioned alkyl, aryl or aralkyl groups, the reactivity tends to decrease as well.

In the above general formula (2), $R^4$ is a univalent hydrocarbon group selected from among aralkyl groups containing 1 to 10 carbon atoms, preferably aralkyl groups containing 1 to 4 carbon atoms same as $R^3$, aryl groups, preferably aryl groups containing 6 to 9 carbon atoms same as $R^3$, aralkyl groups, preferably aralkyl groups containing 7 to 9 carbon atoms same as $R^3$.

In the above general formula (2), $(R^3O)_{4-b}$ is selected so that 4–b is not less than 3, namely b is 0 or 1. From the viewpoint of improvement in curability of coatings formed from the composition of the present invention, b is preferably 0.

When the number of $(R^3O)_{4-b}$ groups occurring in the general formula (2) is 2 or more, the two or more $R^3$ groups contained therein may be the same or different.

As specific examples of the above silicon compound, there may be mentioned, among others, tetraalkyl silicates such as tetramethyl silicate, tetraethyl silicate, tetra-n-propyl silicate, tetraisopropyl silicate, tetra-n-butyl silicate and tetraisobutyl silicate; and silane coupling agents such as methyltrimethoxysilane, methyltriethoxysilane, phenyltrimethoxysilane, phenyltriethoxysilane, octadecyltriethoxysilane, 3-glycidoxypropyltrimethoxysilane, methyltri-sec-octyloxysilane, methyltriphenoxysilane, methyltriisopropoxysilane and methyltributoxysilane.

As specific examples of the above partial hydrolyzate condensate (B) of silicon compound, there may be mentioned those obtained in the conventional manner by adding water to the above tetraalkyl silicates or trialkoxysilanes to thereby causing condensation, for example partial hydrolyzate condensates of tetraalkoxysilane such as MSI 51, ESI 28, ESI 40, HAS-1 and HAS-10 (products of Colcoat Co.), MS 51, MS 56 and MS 56S (products of Mitsubishi Chemical Corp.), and partial hydrolyzate condensates of trialkoxysilane such as AFP-1 (product of Shin-Etsu Chemical Industry), among others.

The above silicon compounds and derivatives thereof (B) may be used either singly or two or more of them may be used incombination.

Among the above partial hydrolyzate condensates (B) of silicon compound, partial hydrolyzate condensates of tetraalkoxysilane such as MSI 51, MS 51, MS 56 and MS 56S (partial hydrolyzate condensates of tetramethoxysilane) and ESI 40 (partial hydrolyzate condensate of tetraethoxysilane) are preferred, since they have good compatibility with the acrylic copolymer (A) and provide the composition of the present invention with good curability and said composition gives coatings excellent in hardness, hence capable of controlling the adhesion of fouling substances. In particular, compounds having a weight average molecular weight of not less than 1,000, such as MS 56, are more preferred, since the amount of addition thereof can be reduced.

The partial hydrolyzate condensates (B) of silicon compound can be obtained by hydrolyzing the above-mentioned silicon compounds and/or partial hydrolyzate condensates of silicon compound in an alcoholic solvent under acidic conditions.

As said alcoholic solvent, there may be mentioned, for example, methanol, ethanol, isopropanol, n-butanol and isobutyl alcohol.

These may be used either singly or two or more of them may be used in combination. Among them, methanol, ethanol and isopropanol are preferred from the stability improvement viewpoint.

The acidic conditions mentioned above refer to such conditions as resulting from addition of (1) an acidic substance or treatment with (2) a cation exchange resin.

Said acidic substance (1) includes inorganic acids such as hydrochloric acid, nitric acid, phosphoric acid, sulfuric acid and sulfurous acid; phosphoric acid esters such as monomethyl phosphate, monoethyl phosphate, monobutyl phosphate, monooctyl phosphate, dioctyl phosphate and didecyl phosphate; carboxylic acid compounds such as formic acid, acetic acid, maleic acid, adipic acid, oxalic acid and succinic acid; and sulfonic acid compounds such as dodecylbenzene sulfonic acid, paratoluenesulfonic acid, 1-naphthalenesulfonic acid and 2-naphthalenesulfonic acid; and the like.

Among them, hydrochloric acid (2), nitric acid, sulfurous acid and formic acid, which have a relatively low boiling point and can be readily removed after acid treatment, are preferred.

As said cation exchange resin, there may be mentioned, for example, Amberlist 15 (product of Rohm & Haas), Duolite C-433 (product of Sumitomo Chemical Industry) and the like. After treatment with a cation exchange resin and water, the cation exchange resin is removed preferably by filtration, decantation or the like.

The components (B) mentioned above may be used either singly or two or more of them may be used in combination. As specific examples of the components (B), there may be mentioned HAS-1 (product of Colcoat) and the like.

From the viewpoint of storage stability after admixing with the component (A), it is preferred that these partial hydrolyzate condensates (B) of silicon compound be supplemented beforehand with methyl orthoformate as a dehydrating agent.

The composition of the present invention further contains a compound (C) having two or more isocyanato groups as a crosslinking agent for the acrylic copolymer (A) and silicon compound or the like.

Said compound having two or more isocyanato groups may be of the aliphatic or aromatic group.

As specific examples of the aliphatic polyfunctional isocyanate, there may be mentioned hexamethylene diisocyanate, dicyclohexylmethane-4,4'-diisocyanate, 2,2,4-trimethyl-1,6-diisocyanate and isophoronediisocyanate, and these may have the structure of monomer, biuret, uredio or isocyanurate.

For curing by heating, blocked polyfunctional isocyanates are used. As the blocking agent, there may be mentioned methyl alcohol, ethyl alcohol, n-propyl alcohol, isopropyl alcohol, n-butyl alcohol, sec-butyl alcohol, methylcellosolve, ethylcellosolve, butylcellosolve, benzyl alcohol, furfuryl alcohol, cyclohexyl alcohol, phenol, o-cresol, m-cresol, p-cresol, p-tert-butylphenol, thymol, p-nitrophenol, β-naphthol and the like. As aromatic polyfunctional isocyanates, there may be mentioned 2,4-tolylene diisocyanate, 2,6-tolylene diisocyanate, diphenylmethane-4, 4'-diisocyanate, xylenediisocyanate, polymethylene-polyphenylene-polyisocyanate and the like. These also includes biuret, uredio and isocyanurate forms.

It is also possible to use two or more of these compounds in combination.

The curing catalyst to be incorporated together with the isocyanate compound includes organometallic compounds. Among them, tin compounds are superior in curability of coatings from the viewpoint of curability of coat. Compounds containing sulfur within the molecule and aluminum chelate compounds are further preferred from the storage stability and curing activity viewpoints.

As specific examples of the organotin compounds, there may be mentioned dioctyltin bis(2-ethylhexyl maleate), condensates of silicate with dioctyltin oxide or dibutyltin oxide, dibutyltin dioctoate, dibutyltin dilaurate, dibutyltin distearate, dibutyltin diacetylacetonate, dibutyltin bis(ethyl maleate), dibutyltin bis(butyl maleate), dibutyltin bis(2-ethylhexyl maleate), dibutyltin bis(oleyl maleate), stannous octoate, tin stearate, and di-n-butyltin laurate oxide. As the tin compounds containing an S atom within the molecule, there may be mentioned dibutyltin bis(isononyl 3-mercaptopropionate), dioctyltin bis(isononyl 3-mercaptopropionate), octylbutyltin bis(isononyl 3-mercaptopropionate), dibutyltin bis(isooctyl thioglycolate), dioctyltin bis(isooctyl thioglycolate), octylbutyltin bis(isooctyl thioglycolate) and the like.

Among the tin compounds mentioned above, those having an S atom within the molecule are preferred because of good storage stability and pot life after incorporation of isocyanates. In particular, dibutyltin bis(isononyl 3-mercapto) and dibutyltin bis(isooctyl thioglycolate) are preferred from the viewpoint of balance between curability and pot life.

As the above-mentioned aluminum chelate compounds, there may be mentioned ethyl acetoacetatoaluminum diisopropylate, aluminum tris(acetylacetonate), aluminum monoacetylacetonatobis(ethyl acetoacetate), alkyl acetylacetatoaluminum diisopropylate and the like.

Among the above-mentioned aluminum chelate compounds, aluminum tris(ethyl acetato) and aluminum tris(acetylacetonate) are preferred, since the storage stability and pot life after admixing of isocyanates are well balanced and the contact angle of coatings becomes small.

Such curing catalysts (D) as mentioned above may be used either singly or two or more catalysts of the same type or differing in type may be used combinedly.

As the above-mentioned mercapto-containing hydrocarbon and/or mercaptosilane (E), there may be mentioned n-dodecylmercaptan, t-dodecylmercaptan, n-butylmercaptan, γ-mercaptopropyltrimethoxysilane or γ-mercaptopropyltriethoxysilane, α-mercaptomethylpentamethyldisiloxane, γ-mercaptopropylpentamethyldisiloxane, γ-mercaptopropyltris(trimethylsiloxy)silane, $(CH_3O)_3Si$—S—S—$Si(OCH_3)_3$, $(CH_3O)_3Si$—$S_8$—$Si(OCH_3)_3$ and the like. From the viewpoint of ready availability and of storage stability after admixing with the isocyanate (C) and organometallic compound (D), γ-mercaptopropyltrimethoxysilane and γ-mercaptopropyltriethoxysilane are preferred, however. These may be used alone or two or more of them may be used in combination. The shelf life after admixing of the above mixture with the acrylic copolymer (A) can also be prolonged.

The proportions of the above-mentioned acrylic copolymer (A), silicon compound or like (B), isocyanate compound (C) and curing catalyst (D) are adjusted so that the silicon compound (B) amounts to 2 to 70 parts, the isocyanate compound (C) to 0.1 to 50 parts, the curing catalyst (D) to 0 to 20 parts and the mercapto-containing hydrocarbon and/or mercaptosilane (E) to 0 to 20 parts, per 100 parts of the acrylic copolymer (A). Among these components, (B) may be added during polymerization of (A) or, further, (B) may be hot-blended with (A) in order that the compatibility between the (A) component and (B) component may be improved.

The above-mentioned partial hydrolyzate condensate (B) of silicon compound is used in an amount of 2 to 70 parts by weight, preferably 2 to 50 parts by weight, more preferably 2 to 30 parts by weight, per 100 parts by weight of the component (A).

When the amount of the partial hydrolyzate condensate (B) of silicon compound is smaller than 2 parts per 100 parts of component (A), the coats formed by using the resulting composition may show that improving effects in curability and/or stain resistance result in insufficient. When it exceeds 70 parts, the surface gloss and other appearance characteristics of the coats may be impaired and/or cracking may occur.

When the amount of the isocyanate compound (C) is smaller than 0.1 part, the resulting composition tends to have low curability. When it exceeds 50 parts, an unreacted isocyanate compound or isocyanate groups may remain in the coatings obtained by using the resulting composition and this may cause shrinkage when a further coat is given and, in addition, makes it difficult to decrease the angle of contact with water, thus preventing the stain resistance from being improved.

Further, when the amount of the curing catalyst (D) exceeds 20 parts, the coatings formed by using the resulting composition is unfavorable because of a tendency toward decreases in appearance characteristics such as surface gloss.

The above-mentioned silicon compound (B) is used preferably in an amount of 3 to 60 parts, more preferably 5 to 50 parts.

From the viewpoint of balance among solvent resistance, impact resistance and stain resistance, the amount of the above-mentioned isocyanate compound is preferably 0.5 to 40 parts, more preferably 1 to 30 parts by weight, most preferably 2 to 20 parts by weight.

The amount of the curing catalyst (D) is preferably 0.2 to 13 parts, more preferably 0.5 to 10 parts, still more preferably 0.5 to 5 parts.

Further, the amount of the mercapto-containing hydrocarbon and/or mercaptosilane (E) is preferably 0.2 to 10 parts, more preferably 0.5 to 5 parts.

As regards the mode of formulation of the above composition, the following are possible: the two-component formulation mode, with the one containing a mixture comprising the acrylic copolymer (A) and silicon compound (B) and the other containing a mixture comprising the isocyanate compound (C) and curing catalyst (D); the two-component formulation mode, with one containing a mixture comprising the acrylic copolymer (A), silicon compound (B) and curing catalyst (D) and the other containing the isocyanate (C); and, further, when the isocyanate component used is a blocked type one, the one-component formulation mode, with the one containing the acrylic copolymer (A), silicon compound (B), isocyanate compound (C) and curing catalyst (D).

The curable composition for top coating according to the present invention can be prepared by stirring and mixing the acrylic copolymer (A), silicon compound or like (B), isocyanate compound (C), curing catalyst (D) and mercapto-containing hydrocarbon and/or mercaptosilane (E) using a stirrer or the like, for instance, to give a uniform composition. By further incorporating a dehydrating agent in the acrylic copolymer (A) and silicon compound or partial hydrolyzate condensate (B), it is possible to maintain the storage stability of the composition at a satisfactory level over a long period of time.

As specific examples of said dehydrating agent, there may be mentioned methyl orthformate, ethyl orthoformate, methyl orthoacetate, ethyl orthoacetate, trimethyl orthopropionate, triethyl orthopropionate, trimethyl orthoisopropionate, triethyl orthoisopropionate, trimethyl orthobutyrate, triethyl orthobutyrate, trimethyl orthoisobutyrate, triethyl orthoisobutyrate and like hydrolyzable ester compounds; dimethoxymethane, 1,1-dimethoxyethane, 1,1-dimethoxypropane, 1,1-dimethoxybutane; ethyl silicate (tetraethoxysilane), methyl silicate (tetramethoxysilane), methyltrimethoxysilane and the like. Among them, methyl orthoacetate is preferred because of its dehydrating effect. These may be used either singly or two or more of them may be used in combination.

Said dehydrating agent is used in an amount of not more than 200 parts, preferably not more than 100 parts, more preferably not more than 50 parts, per 100 parts of the sum total of the component (A) and component (B). They may be added to the components before production of the acrylic copolymer (A) by polymerization, or they may be added during polymerization of the acrylic copolymer (A) or in the step of blending the acrylic copolymer (A) obtained with the other components, thus the time of addition thereof is not particularly limited.

It is preferred that said dehydrating agent be added after hydrolysis of the silicon compound or partial hydrolyzate condensate of silicon compound in an alcoholic solvent under acidic conditions.

While the amount of addition of the dehydrating agent is not particularly restricted, it is generally preferred that the total amount of the dehydrating agent and alkyl alcohol be about 0.5 to 20 parts, more preferably about 2 to 10 parts, per 100 parts of the resin solids comprising the acrylic copolymer (A) or hydrolyzate condensate of silicon compound.

In the curable composition for top coating according to the present invention, there may further be incorporated, each in an appropriate amount, what are generally used in coating compositions, for example pigments such as inorganic pigments, e.g. titanium oxide, ultramarine blue, Prussian blue, zinc white, iron oxide red, chrome yellow, white lead, carbon black, transparent iron oxide and pulverized aluminum and organic pigments, e.g. azo pigments, triphenylmethane pigments, quinoline pigments, anthraquinone pigments and phthalocyanine pigments; diluents, ultraviolet absorbers, light stabilizers, antisagging agents, leveling agents and like additives; cellulosics such as nitrocellulose and cellulose acetate butyrate; and resins such as epoxy resins, melamine resins, vinyl chloride resins, fluororesins, chlorinated polypropylene, chlorinated rubber, polyvinyl butyral and polysiloxanes.

The curable composition for top coating according to the present invention is applied to substrates, or articles to be coated, by conventional methods, for example by dipping, spraying or application using a brush or the like, and generally cured by allowing to stand at ordinary temperature or by baking at about 30° C. or above.

The curable composition for top coating according to the present invention is judiciously used as a coating composition for top coating of buildings or constructions, household electric appliances, industrial equipment or instruments made of metals, ceramics, glass, cement, ceramic molded articles, inorganic boards, plastic materials, wood, paper, fibers and the like.

In most cases, the curable composition for top coating according to the present invention is used as one of a plurality of coats. As the undercoating composition in that case, there may be mentioned epoxy-based penetrating sealers, acrylic rubber-based waterproof paints, acrylic emulsions, reactive epoxy emulsions containing filler and the like. Those acrylic paints, urethane paints, fluororesin paints and acrylsilicone paints which are generally used as top coating compositions can be used as undercoating or intermediate coating compositions for the purpose of improving the adhesion with the topcoat as well as the impact resistance and securing the durability (prevention of cracking and the like) by improving the compatibility with the undercoat. In certain instances, the above-mentioned acrylic paints, urethane paints, fluororesin paints and acrylsilicone paints may be of the low pollution type containing silicate component such as mentioned hereinabove.

BEST MODES FOR CARRYING OUT THE INVENTION

The following examples illustrate the curable composition for top coating according to the present invention in further detail. Such examples are, however, by no means limitative of the scope of the present invention.

PRODUCTION EXAMPLE 1

Production of Acrylic Copolymer (A)

A reaction vessel equipped with a stirrer, thermometer, reflux condenser, nitrogen gas inlet tube and a dropping funnel was charged with 40 parts of xylene, and the temperature was raised to 110° C. while introducing nitrogen gas. Then, a mixture composed of 10 parts of γ-methacryloxypropyltrimethoxysilane, 5 parts of 2-hydroxyethyl methacrylate, 25 parts of methyl methacrylate, 45 parts of n-butyl methacrylate, 14 parts of n-butyl acrylate, 1 part of acrylamide, 18 parts of xylene and 1 part of 2,2'-azobisisobutyronitrile was added dropwise through the dropping funnel at a constant rate over 5 hours.

After completion of the dropping, 0.1 part of 2,2'-azobisisobutyronitrile and 8 parts of toluene were added dropwise at a constant rate over 1 hour. The resulting mixture was matured at 110° C. for 2 hours and then cooled, and xylene was added to the resin solution to give a solution of an acrylic copolymer (A)-1 with a resin solid concentration of 50%.

The acrylic copolymer (A)-1 obtained had an average molecular weight of 15,000.

PRODUCTION EXAMPLE 2

Production of Acrylic Copolymer (A)

A solution of an acrylic copolymer (A)-2 with a resin solid concentration of 50% was obtained in the same manner as in Production Example 1 except that 13 parts of γ-methacryloxypropyltrimethoxysilane was used in lieu of 10 parts, 10 parts of 2-hydroxyethyl methacrylate in lieu of 5 parts, 44 parts of methyl methacrylate in lieu of 25 parts and 32 parts of n-butyl acrylate in lieu of 14 parts and that n-butyl methacrylate was not used. The acrylic copolymer (A)-2 obtained had a number average molecular weight of 15,000.

PRODUCTION EXAMPLE 3

Production of Acrylic Copolymer (A)

A solution of an acrylic copolymer (A)-3 with a resin solid concentration of 50% was obtained in the same manner as in Production Example 1 except that 45 parts of γ-methacryloxypropyltrimethoxysilane was used in lieu of 10 parts, 20 parts of 2-hydroxyethyl methacrylate in lieu of 5 parts, 10 parts of methyl methacrylate in lieu of 25 parts, 10 parts of n-butylacrylate in lieu of 14 parts, 14 parts of n-butyl methacrylate in lieu of 45 parts and 2 parts of azobisisobutyronitrile in lieu of 1 part. The acrylic copolymer (A)-3 obtained had a number average molecular weight of 10,000.

PRODUCTION EXAMPLE 4

Production of Acrylic Copolymer (A)

According to the procedure of Production Example 1, the reaction vessel was first charged with 31 parts of xylene, followed by dropwise addition over 5 hours of a mixture composed of 13.6 parts of γ-methacryloxypropyltrimethoxysilane, 5 parts of 2-hydroxyethyl methacrylate, 14.2 parts of methyl methacrylate, 22.3 parts of n-butyl acrylate, 14 parts of styrene, 0.9 part of acrylamide, 3.8 parts of 2,2'-azobisisobutyronitrile and 14 parts of xylene.

After completion of the dropping, a mixture composed of 0.2 part of 2,2'-azobisisobutyronitrile, 4 parts of xylene and 4 parts of toluene was added dropwise at a constant rate over 1 hour. The reaction product obtained had a resin solid concentration of 63% and the acrylic copolymer (A)-4 obatained had a number average molecular weight of 6,000.

PRODUCTION EXAMPLE 5

Production of Acrylic Copolymer (A)

In accordance with the procedure of Production Example 4, a mixture composed of 16 parts of γ-methacryloxypropyltrimethoxysilane, 18.1 parts of PLACCEL FM-1 (product of Daicel Chemical Industries), 21.5 parts of methyl methacrylate, 25 parts of n-butyl methacrylate, 9.4 parts of n-butyl acrylate, 10 parts of styrene, 4 parts of 2,2'-azobisisobutyronitrile, 1.7 parts of V-59 (product of Wako Pure Chemical Industries), 9 parts of xylene and 5 parts of toluene was added dropwise at a constant rate over 5 hours.

After completion of the dropping, a mixture composed of 0.3 part of V-59, 4 parts of xylene and 4 parts of toluene was added dropwise at a constant rate over 1 hour. The reaction product obtained had a resin solid concentration of 63% and the acrylic copolymer (A)-5 contained therein had a number average molecular weight of 3,800.

EXAMPLE 1

To a mixed solution prepared by adding 10 parts of MS 56 (partial hydrolyzate condensate of tetramethoxysilane, product of Mitsubishi Chemical Corp.) as a silicon compound and like (B) to 100 parts of the acrylic copolymer (A)-1 as resin solids obtained in Production Example 1, there was added 40 parts of titanium oxide (CR-95, product of Ishihara Sangyo Co.) as a pigment. The resulting mixture was treated for effecting dispersion in a paint conditioner using glass beads for 2 hours, to give a white enamel composition with a solid concentration of 60%. To the white enamel obtained, there was added a mixture prepared in advance from hexamethylene diisocyanate (C)-1 as an isocyanate compound and dibutyltin bis(isooctyl thioglycolate) (D)-1 as a tin catalyst containing sulfur (D) in the respective amounts accounting for 1 part and 6 parts per 100 parts of the resin solids in the acrylic copolymer (A)-1 solution. After further addition of a thinner, the resulting mixture was stirred using an agitator for 5 minutes to give a composition with a solid concentration of 45%.

The composition obtained was applied to a dry coat thickness of 20 to 30 μm in the manner of one day one coat to steel sheets provided with an epoxy intermediate coat (V Top H intermediate coat; product of Dainippon Paint) to a dry coat thickness of 40 to 60 μm, to give samples. Using a cutter, cuts were given to these samples to the depth arriving at the substrate and, 1 day, 2 days, 3 days, 6 days, 10 days and 14 days following application of the top coat, an epoxy intermediate coat was given using a brush and the condition of each coat was observed for each period, whereby it was confirmed that there was no shrinkage or no like defect.

The surface condition, gloss, stain resistance, weather resistance, contact angle, adhesiveness, and shrinkage upon intermediate coat of each coat were evaluated in the following manner.

(a) Surface Condition

The coat surface was observed by the eye and evaluated according to the following criteria:

(Evaluation Criteria)

A: No cracking is observed at all, and the surface condition is good.

B: Minute cracking is partially observable.

C: Cracking is observed all over the surface.

(b) Gloss

The gloss of each coat surface was measured according to JIS K 5400 using a Minolta model GM 268 gloss meter (60° gloss).

(c) Stain Resistance (ΔL Value)

The color of the coat surface immediately after formation and that of the coat surface after 3 months outdoor exposure in Settu City, Osaka Prefecture were measured using a Minolta model CR-300 color difference meter, and the color difference (ΔL value) was calculated from the L values (brightness values) obtained.

(d) Weather Resistance (Gloss Retention)

The gloss of the coat surface immediately after formation and that of the coat surface after 2,000 hours of exposure using a sunshine weather-o-meter were measured, and the gloss retention (%) after the lapse of 2,000 hours was calculated.

(e) Contact Angle

The static angle of contact with water of the coat surface immediately after formation was measured using a contact angle measuring apparatus (Kyowa Kaimen Kagaku model CA-S 150).

(f) Adhessiveness

A commercial intermediate coating composition V Top H (product of Dai Nippon Toryo Co.) was applied to a steel sheet and, on the next day, the top coating composition was applied. After one day curing at room temperature (23°, 55% humidity), the adhesiveness was evaluated by measuring the cross cut adhesiveness according to JIS K 5400.

(Evaluation Results)

10: 100/100

8: 80/100

6: 60/100

4: 40/100

2: 20/100

0: 0/100

(g) Shrinkage

The shrinkage upon intermediate coating was evaluated according to the following criteria:

(Criteria)

○: No abnormality was observed on the coat.

Δ: Shrinking occurred only in cut portions.

X: Shrinking occurred all over the recoated surface.

(h) Impact Resistance

For impact resistance evaluation, steel sheets (70×150×4.0 mm) were polished with a No. 250 sand paper, the top coating composition was then applied to a thickness of 20 to 30 μm and, after 7 days of curing at 23° C. and 55% R.H., the coated sample was exposed to sunshine weather-o-meter conditions for 48 hours. Then, after drying, the coat was subjected to du Pont impact testing and the coat was observed for absence or presence of any abnormality.

The results thus obtained are summarized in Table 2.

EXAMPLES 2 TO 9, 13 AND COMPARATIVE EXAMPLES 1 TO 3

Using the respective compositions specified in Table 1 and following the procedure of Example 1, white enamel compositions with a solid concentration of 60% were prepared and, from these white enamel compositions, respective compositions with a solid concentration of 45% were obtained.

The compositions obtained in Examples 2 to 9 and 13 and Comparative Examples 1 to 3 were each applied, to a dry coat thickness of 20 to 30 μm, to steel sheets provided with an epoxy intermediate coating (V Top H intermediate coat (product of Dai Nippon Toryo)), by the air spray method, followed by curing under the curing conditions specified in Table 1 to form coats. In Comparative Examples 1 and 2, 2 parts of a 1:2 (mole ratio) reaction product from a bisphenol A-based bifunctional epoxy compound (Epikote 828; product of Yuka Shell Epoxy) and γ-aminopropyltriethoxysilane and 0.8 part of aminoethylaminopropyltrimethoxysilane were added to 100 parts (as resin solids) of the acrylic copolymer (A) for the purpose of securing adhesion to the substrate and epoxy intermediate coating.

Each coat was evaluated by the evaluation methods described in Example 1. The results thus obtained are summarized in Table 2.

EXAMPLES 10 TO 12 AND COMPARATIVE EXAMPLES 4 AND 5

The silicon compound and isocyanate (C) specified in Table 1 were incorporated in the acrylic copolymer (A)-4 and (A)-5 solutions obtained in Production Examples 4 and 5. Ciba-Geigy's Tinuvin 384 (2 parts) and Tinuvin 123 (1 part) and a leveling agent (0.4 part; L-1984-50, product of Kusumoto Kasei) were added per 100 parts of the total resin solids. Each resulting mixture was adjusted to a Ford cup viscosity of about 20 to 25 seconds by dilution with xylene, to give a clear coating composition for top coating.

Test specimens were prepared by applying an epoxy amide-based cationic electrodeposition primer for automobiles and an intermediate surfacer to degreased and phosphatized soft steel sheets. These were coated with a commercial base coat paint (Superlac F50 White, product of Nippon Paint). After application of base coat, each coat was subjected to 5 minutes of setting and then to 20 minutes of baking at 140° C. At that time, the base coat thickness was 15 μm. Then, each coat was water-polished using a #800 sand paper, and a coating composition prepared by adding the curing catalyst (D) specified in Table 1 to the above-mentioned clear coating composition for top coating was applied. After 5 minutes of setting, baking was performed at 70° C. for 30 minutes. Each coated sheet was cured at 23° C. and 55% relative humidity for 5 days, whereby a cured product (coat) was obtained on the surface. The top coat thickness at that time was 40 μm.

Each coat was evaluated by the methods described in Example 1. The results thus obtained are summarized in Table 2.

TABLE 1

| No. | Acrylic copolymer (A) | Silicon compound or like (B) | Isocyanate compound (C) | Curing catalyst (D) | Mercapto-silane (E) | Temp. (° C.) | Time |
|---|---|---|---|---|---|---|---|
| Example | | | | | | | |
| 1 | (A)-1(100) | MS56(5) | (C)-1(5) | — | — | 140 | 20 min. |
| 2 | (A)-1(100) | MS56(10) | (C)-1(4) | (D)-1(1) | — | 23 | 7 days |
| 3 | (A)-2(100) | MS56(5) | (C)-2(6) | (D)-2(0.5) | — | 140 | 20 min. |
| 4 | (A)-3(100) | MS56(15) | (C)-3(12) | (D)-3(1) | — | 140 | 20 min. |
| 5 | (A)-1(100) | MS56(20) | (C)-1(3) | (D)-1(1.5) | (E)-1(0.5) | 23 | 7 days |
| 6 | (A)-2(100) | MS151(30) | (C)-4(7) | (D)-2(2) | — | 23 | 7 days |
| 7 | (A)-3(100) | ES140(20) | (C)-1(15) | (D)-2(0.8) | (E)-2(1.0) | 23 | 7 days |
| 8 | (A)-2(100) | MS151(10) ES140(20) | (C)-1(5) | (D)-1(1.5) | — | 23 | 7 days |
| 9 | (A)-3(100) | MS56(10) | (C)-5(17) | (D)-3(2) | (E)-1(0.8) | 140 | 20 min. |
| 10 | (A)-4(100) | MS56(10) | (C)-1(5) | (D)-1(1) | — | 70 | 30 min. |
| 11 | (A)-4(100) | MS56(5) | (C)-5(8) | (D)-4(0.5) | — | 70 | 30 min. |
| 12 | (A)-5(100) | MS56(5) | (C)-1(5) | (D)-1(1) | — | 70 | 30 min. |
| 13 | (A)-1(100) | MS56(10) | (C)-1(5) | (D)-4(1) | — | 23 | 7 days |
| Compar. Ex. | | | | | | | |
| 1 | (A)-1(100) | — | — | D-4(1) | (E)-2(0.8) | 23 | 7 days |
| 2 | (A)-2(100) | MS56(10) | — | D-1(1.5) | — | 23 | 7 days |
| 3 | (A)-3(100) | MS151(90) | (C)-1(13) | D-2(2) | (E)-1(0.5) | 23 | 7 days |
| 4 | (A)-4(100) | — | (C)-1(5) | D-1(1) | — | 70 | 30 min. |
| 5 | (A)-5(100) | MS151(5) | — | D-1(1) | — | 70 | 30 min. |

TABLE 2

| | | | | Coat characteristics | | | | |
|---|---|---|---|---|---|---|---|---|
| No. | Surface condition | Gloss | Strain resistance (ΔL) | Weather resistance (gloss retention) (%) | Contact angle | adhesive-ness | Shrink-age | Impact resistance (Du Pont impact rsistance) |
| Example | | | | | | | | |
| 1 | A | 91 | −1.7 | 85 | 68° | 10 | Δ | 1 kg × 50 cm |
| 2 | A | 89 | −1.0 | 92 | 60° | 10 | ○ | 1 kg × 50 cm |

TABLE 2-continued

| | | | | Coat characteristics | | | | |
|---|---|---|---|---|---|---|---|---|
| No. | Surface condition | Gloss | Strain resistance ($\Delta L$) | Weather resistance (gloss retention) (%) | Contact angle | adhesive-ness | Shrink-age | Impact resistance (Du Pont impact rsistance) |
| 3 | A | 87 | −1.5 | 89 | 64° | 10 | ○ | 1 kg × 50 cm |
| 4 | A | 86 | −0.9 | 90 | 58° | 10 | ○ | 1 kg × 50 cm |
| 5 | A | 90 | −0.7 | 92 | 55° | 10 | ○ | 1 kg × 50 cm |
| 6 | A | 84 | −1.9 | 90 | 68° | 10 | ○ | 1 kg × 50 cm |
| 7 | A | 85 | −1.8 | 88 | 69° | 10 | ○ | 1 kg × 50 cm |
| 8 | A | 86 | −1.7 | 90 | 67° | 10 | ○ | 1 kg × 50 cm |
| 9 | A | 90 | −0.9 | 92 | 56° | 10 | ○ | 1 kg × 50 cm |
| 10 | A | 85 | −1.4 | 91 | 68° | 10 | ○ | — |
| 11 | A | 87 | −1.3 | 92 | 67° | 10 | ○ | — |
| 12 | A | 83 | −1.7 | 89 | 69° | 10 | ○ | — |
| 13 | A | 88 | −1.0 | 92 | 58° | 10 | ○ | 1 kg × 50 cm |
| Compar. Example | | | | | | | | |
| 1 | A | 86 | −8.9 | 87 | 90° | 10 | X | 300 g × 50 cm |
| 2 | A | 85 | −1.0 | 90 | 58° | 10 | X | 300 g × 50 cm |
| 3 | C | 60 | −1.3 | 89 | 65° | 10 | ○ | 1 kg × 50 cm |
| 4 | A | 86 | −7.9 | 88 | 89° | — | — | — |
| 5 | B | 70 | −1.2 | 90 | 68° | — | X | — |

The components (C), (D) and (E) formulated in Examples 1 to 13 and Comparative Examples 1 to 5 are as follows:

Isocyanate Compound (C)

(C)-1: Hexamethylene diisocyanate
(C)-2: Phenol-blocked hexamethylene diisocyanate
(C)-3: 2,4-Tolylene diisocyanate
(C)-4: Xylenediisocyanate
(C)-5: Isophoronediisocyanate Curing Catalyst (D)

(D)-1: Dibutyltin bis(isooctyl thioglycolate)
(D)-2: Dibutyltin bis(isononyl 3-mercaptopropionate)
(D)-3: Aluminum tris(ethyl acetate)
(D)-4: Dibutyltin bis(butyl maleate)

Mercapto-containing Hydrocarbon and/or Mercaptosilane (E)

(E)-1: γ-Mercaptopropyltrimethoxysilane
(E)-2: n-Dodecylmercaptan

What is claimed is:

1. A curable composition for top coating which comprises an acrylic copolymer (A) containing a reactive silyl group bound to a carbon atom as represented by the following general formula (1)

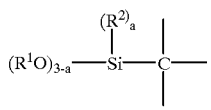

(1)

wherein $R^1$ represents a hydrogen atom or an alkyl group containing 1 to 10 carbon atoms, $R^2$ represents a hydrogen atom or a univalent hydrocarbon group selected from among alkyl groups containing 1 to 10 carbon atoms, aryl groups and aralkyl groups and a represents an integer of 0 to 2, and a hydroxyl group; 2 to 70 parts by weight, per 100 parts by weight of said acrylic copolymer (A), of a partial hydrolyzate condensate (B) of a silicon compound represented by the general formula (2)

(2)

wherein $R^3$ represents a univalent hydrocarbon group selected from among alkyl groups containing 1 to 10 carbon atoms, aryl groups and aralkyl groups, $R^4$ represents a univalent hydrocarbon group selected from among alkyl groups containing 1 to 10 carbon atoms, aryl groups and aralkyl groups and b represents 0 or 1; and 0.1 to 50 parts by weight, per 100 parts by weight of said acrylic copolymer (A), of a compound (C) containing two or more isocyanate groups which serves as a crosslinking agent.

2. The curable composition for top coating according to claim 1, wherein the acrylic copolymer (A) is a copolymer which contains 3 to 90% by weight of monomer units comprising a carbon-bound reactive silyl group represented by general formula (1) within the molecule thereof.

3. The curable composition for top coating according to claim 1, wherein the acrylic copolymer (A) is a copolymer containing a n-butyl methacrylate unit as a polymer component.

4. A curable composition for top coating which comprises 0 to 20 parts by weight, per 100 parts by weight of said acrylic copolymer (A), of an organometallic compound (D) incorporated as a curing catalyst in the curable composition for top coating according to claim 1.

5. The curable composition for top coating according to claim 4, wherein the organometallic compound (D) is an organotin compound.

6. The curable composition for top coating according to claim 4, wherein the organometallic compound (D) is a tin compound containing a sulfur atom within the molecule of the tin compound.

7. The curable composition for top coating according to claim 4, wherein the organometallic compound (D) is an aluminum chelate compound.

8. A curable composition for top coating which further comprises a mercapto-containing hydrocarbon and/or a mercaptosilane (E) incorporated in the curable composition for top coating according to claim 5.

9. A coated article which is coated with the curable composition for top coating according to claim 1.

10. A coated article which is coated with a metallic powder- and/or color pigment-containing coating composition and further with a top coat clear coating composition thereon, wherein the top coat clear coating composition contains, as a main component thereof, the curable composition for top coating according to claim 1.

11. A coated article which is coated with a coating composition mainly comprising a dispersion composed of a curable composition for top coating and a pigment, wherein the curable composition for top coating is the curable composition for top coating according to claim 1.

12. The curable composition for top coating according to claim 2, wherein the acrylic copolymer (A) is a copolymer containing a n-butyl methacrylate unit as a polymer component.

13. A curable composition for top coating which further comprises a mercapto-containing hydrocarbon and/or a mercaptosilane (E) incorporated in the curable composition for top coating according to claim 6.

14. A coated article which is coated with the curable composition for top coating according to claim 4.

15. A coated article which is coated with the curable composition for top coating according to claim 8.

16. A coated article which is coated with a metallic powder- and/or color pigment-containing coating composition and further with a top coat clear coating composition thereon, wherein the top coat clear coating composition contains, as a main component thereof, a curable composition for top coating according to claim 4.

17. A coated article which is coated with a metallic powder- and/or color pigment-containing coating composition and further with a top coat clear coating composition thereon, wherein the top coat clear coating composition contains, as a main component thereof, the curable composition for top coating according to claim 8.

18. A coated article which is coated with a coating composition mainly comprising a dispersion composed of a curable composition for top coating and a pigment, wherein the curable composition for top coating is the curable composition for top coating according to claim 4.

19. A coated article which is coated with a coating composition mainly comprising a dispersion composed of a curable composition for top coating and a pigment, wherein the curable composition for top coating is the curable composition for top coating according to claim 8.

* * * * *